(12) United States Patent
Davis

(10) Patent No.: X2954
(45) Date of Patent: May 27, 1818

(54) TUYERE & WATER BACK

(76) Inventor: Gideon Davis

United States Patent

Patent No.: X2954

For Gideon Davis Specification Impt in the Plough, Patented to him on the 27th May 1818. see Vol. 5. page 461.

Ayl.

Gideon Davis, Patented October 1. 1825.
Reissued, March 6. 1833

Letters Patent.

The schedule referred to in these Letters Patent and making part of the same
containing a description in the words of the said Gideon Davis himself of his
improvement in the bar share or fallow) plough patented to him on the 1st
day of October 1825. which Letters Patent being hereby cancelled on account of a
defective Specification, The greatest possible perfection to be attained in the Bar share or fallow Plough
is that it be so shaped and constructed as to detach the furrow slice from the
solid ground, raise it up and turn it over in the easiest, the neatest, the most
uniform and effectual manner, with the least labor, both to the ploughman and
the team combining at the same time, also the advantages of being simple in its
structure, strong, durable, easy to keep in repair, and cheap withall.

With a view as far as is practicable to combine all these various objects
I begin by making the mould-board land side and standard (a birth or place
for the Beam to rest on) all of cast iron, and in a solid piece this I do in the man-
-ner which Charles Newbold of New Jersey made his improved plough patented
in the year 1797 But with these several alterations and improvements
hereinafter particularly specified and described.

First item of the shape of the moulding part or what is commonly called the face
of the moulding board. The general principle heretofore concurred in by all scien-
-tific men, who have turned their attention to this subject, is, that as the furrow slice is
detached from the solid ground at a straight line parallel to the surface and what-
-ever depth may be required, that it should be raised up and turned over, so as to
retain as far as possible that same flat shape, and in order to accomodate the shape
of the moulding part, or what is commonly called the face of the mould board. to
this idea of raising the furrow slice up, and turning it over, it has been so constructed
as to form straight lines lengthwise, either horizontal or more or less inclined, so as
to correspond with another set of straight lines at right angles with the land side or nearly so commencing at the point, touching the edge of the shoe and lower edge of the mould board which as they recede from the point of commencement gradually change from a horizontal, to a perpendicular direction, and even pass beyond the perpendicular far enough to give the proper overset behind and it has been thought that mould boards so constructed, would fit and embrace every part of the under side of the furrow slice, in the operation of raising it up, and turning it over in the most perfect manner possible Not observing however that the furrow slice does and must necessarily acquire a convex form on the under side of it, during the operation of its being raised up and turned over, But the true state of the case is, that in detaching the furrow slice from the solid ground raising it up and turning it over it always does either acquire a convex form on the under side, or else it is broken off into pieces, and thrown over in chunks. Then as might well be anticipated it is, and always will be found that all the mould boards which are constructed on this principle wear through in the operation of ploughing about midway, whilst the upper and lower edges are scarcely rubbed at all It also necessarily results that ploughs of this construction work hard and are of heavy draught, because the moulding part or the face of the mould board thus worked off is not adapted to the convex form which the furrow slice is disposed to assume, of course it lifts at a single point, and that in the middle of the mould board or partially so) instead of being equally applied over the whole face of it.

In order to remedy the inconveniences arising from this mode of structure I form the moulding part or the face of the mould board of my plough, into a different shape. This I do with a view to make it fit and embrace the convex form, which the furrow slice is disposed to assume, in the act of being raised up and turned over, and thereby bring it as near as may be to an equal bearing on all parts of the face of the mould board so as to render the wear of it as nearly uniform throughout as it can be made to wear. Which to do instead of working off the moulding part, or the face of the mould board ~~up of~~ my plough to straight lines correspondent to a straight line at right angles or nearly so, I work it off to fit circular or spheric lines of different Radius and at various angles, which to explain see plate Fig 1st. Is a segment of a circle of 36 inches radii. Fig 2 is segment of a circle 12 inches radii. Fig. 3 is a bottom view of the moulding part of my improved plough including the land side and shoe, (or heel piece) with the mould board and shoe, Fig 4. is a right hand side view of a right hand plough with a cast iron share, Fig 5 is a left hand view of a right hand plough with a wrought iron share, To shape the moulding part or make the face of the mould board suppose it to be for a 10 inch (or a two horse) plough, such as would be a suitable size for turning a furrow slice of about 12 inches, having obtained a suitable block, I begin by laying off the bottom, see fig. 3 I consider 24 inches a suitable length for the land side, say from (a.) at the point to (b.) at the heel of the plough; it may be more or less; from (a.) at the point I draw a circular line, with the large segment fig. 1. so as to intersect a line at right angles to the plane of the land side at b.) and 12 inches distant, with the arch of the circle extended out from the plane of the land side see (a. a. a. a.) Then having worked the edge of the block nicely off to this line, I turn the block down on this bottom, and then work the side from (a.) at the point (fig. 4. to a.) at a perpendicular raised 12 inches from the horizon or bottom) and 24 inches back from the point of commencement, and vertical to the circular bottom line at that point with the arch of the circle extended in towards the plane of the land side. Then having wrought to the shape of this circular line, I apply the small segment Fig. 2. with the arch of the circle extended in towards the aforesaid two lines, and as near at right angles with them as is practicable, and then I work off the face of the block so, that this small segment will touch the aforesaid two circular lines, at various places, corresponding to lines (c, c, c, c, &c.) and so as to produce as near as may be an equal bearing on all parts of the face of the block. These lines at (c c &c.) if extended would all terminate at a point at (d.) which is about 24 inches below the horizontal line (or bottom) of the mould board and vertical to heal or end of the land side. This done forms a shape which so far as appears) has not before been applied to any solid, that is, not before used, or even known, But which however, of these shapes, that are known and used, it is thought to approach nearest to those of the loxodromic or spiral curve but it is not exactly either, neither can I find a name that would properly embrace this shape, save it is, (moulding form for reversing the soil.) But it is a fact that this shape when applied to practice, is found in the operation of raising the furrow slice up and turning it over, to fit the convex form, which it is disposed to assume on the under side, much more uniformly, than any other shape heretofore applied to that purpose. The proof is, that mould boards of this shape wear on all parts (or over the whole face) as near alike as it is to be expected that a
mould board will wear.
This is one shape which has been put into practice, and in various sizes, from the
large three horse (12 inch) plough, down to the small one, horse (7 inch) plough, and
all work and wear to good satisfaction
But this principle may be modified so as to produce a vast variety of different shapes
merely by enlarging or diminishing the radii of either, the horizontal or incline
circular lines lengthwise or of the circle of the of the segment which is applied crosswise,
wise, and all of which, no matter to what extent, is only a modification of the same
principle which may be produced by simple changes of the radius which are used
in preparing the segments to work by. Then after having obtained this shape in
whatever I consider to be the best form adapted to my purpose among all the vast
variety of simple changes that may be made; I mould the face of the block in sand [illegible]
take casts in lead then finish off the pattern for the mould board in proper style,
Believing that this mode or rule of attaining a proper shape for the
moulding part or what is commonly called the face of the mould board of a plough
is an original invention of my own, not heretofore used, or ever known, and that
it is a very useful and important improvement in the plough, I therefore claim
the whole exclusive privilege of making, using and vending the same to others
to make, use, and vend, and that in all the variety of simple changes that may be
made conformably to the rule heretofore described.
Second Item. of the shape of the throat (as it is [illegible] called) [illegible]
of the hind part of the mould board see Fig 4 and 5. [illegible] I construct this
part of my plough with a gentle curve, from the top of the share [illegible]
to the beam; which at a suitable hight for any plough, correspondent to its size
will incline so much forward at the top as to project considerably over. This is the
termination of the fore and top part of the mould board the top of which is made so
as to form a birth or place, for the beam to rest upon, and be made fast to, and is
properly the Standard. (or sheath) of the plough. I also dress off the edge or fore part
of the throat round as it ascends from the top of the share, and make it round instead
of its being sharp as it naturally would be, if left at the angle which it forms
with the land side and I make it broad and broader as it approaches the
beam. The object and use of this particular shape and form for the throat of the plough is to prevent brambly, long grass, weeds, or trash of any kind from lapping so short on the throat, as they would do, if it was sharp, consequently prevent it from hanging & dragging with the plough, as it otherwise would do, and the inclination forward at the upper part of the throat, forms a curve with the under side of the beam so as to prevent any thing from becoming jammed, under the beam in ploughing because the pressure from below naturally forces the incumbrance up, then it works forward, and of course it falls off, and the plough runs clear.

The effect is; that in using a plough with the throat of this construction, and without a sward or cutter the seldom if ever choak, this I consider an improvement of great value in ploughing in (or among) clover, any tall grass, weeds, long manure &c.

The hind part of the mould board. see (f) fig. 4. I drop off in a gentle curve from the hind end of the wing of the share up to the hind corner of the mould board This shape answers every purpose in turning over the furrow slice and as it does not come down to the bottom of the furrow; the plough works easier to the ploughman, is lighter, cheaper, and handsomer, Believing that the shapes for the throat (or fore part) and hind part of the mould-board, have not been known or used before I applied them to use, and that they are valuable improvements in the construction and use of the plough I therefore claim the whole and exclusive right of the use and control of them to use and vend to other, &c Third Item, of the structure of the land side and the connection of it with the mould board and of the standard or fore and top part of the mould board. In the construction of the plough Charles Newbold aforesaid, in his improvement made the land side and mould board in a solid piece. His land side was nearly square, and made stout in order to give it strength I make the land side of my plough thin and broad see (g.) fig 3 and 5. which shape gives more strength vertically and without so much weight. this form of structure makes it a guard also which prevents sods and dirt from working and clogging that part of the plough. In order then to give the necessary strength side wise, I make a rib on the land side about midway between the top and the bottom of it see (h.) fig. 3. this rib I make broad where it joins the mould board at (h.) and tapering as it extends back, towards the end of the land side where there is a birth for the handle of the plough to be fastened on at (i) Fig. 3. and (k) Fig. 5, where I make a projection (or jog) which however cannot be represented in this drawing to rise about half an inch for the end of the handle to rest against. This rest (or jog) sustains the pressure of the handle endwise, so that the screw bolt is only required to confine it sidewise.

Charles Newbold aforesaid in the construction of his improved plough made the standard (or fore and top part of the mould board) to pass up through a mortise in the beam. In my plough I make the standard (for fore and top part of the mould board) to extend only up to the beam, the top of it I make broad and flat, so that the beam may rest solid on it, and be fastened to it with a strong screw bolt: which may be made either to pass up through the top of the standard vertically at (j) Fig 5, or it may pass down through the beam and the standard in an inclined direction, having on the inside of it a birth for the nut of the screw to work on at (j) Fig. 4. my object in using this mode of connecting the standard and the beam together, is, that of adjusting the plough, that is, that this, which I term the beam bolt, I use also as a swivel on which to turn the beam to the right or left, by the operation of which, the plough may be made take more or less land. There has been heretofore land sides constructed which were made broad and thin, but supported in a different manner, my improvement therefore consists only in my mode of making and applying the rib and the advantage of this particular mode, which is, that a rib thus made and applied give ample support to the land side in every way, and is at the same time entirely out of the way in ploughing so that clods dirt &c which sometimes pass in between the land side and the mould board, and clog up that part of the plough go through, and are not at all in the way. The peculiar shape in which I make the mould board of my plough, and of bringing the forepart of it (or rather) the standard up to the beam naturally causes it to extend further forward under the beam, than the standard, of any other construction of the plough does that I have seen, and which is quite an improvement because it equalizes the bearing of it the effect is that a smaller piece of timber will make the beam, than would if the standard and fastening to the handle were made nearer together, and of course the plough is lighter,

What I claim as my own invention and improvement in this item is the mode of connecting the land side to the mould board by a rib as here described, with the jog (or rest) on the land side to sustain the handle, and the extension of the standard, or fore and top part of the mould board, forward, so much further under the beam than is usual; all of which I believe tend much to the improvement of the plough, and which I claim the use and control of as aforesaid.

Fourth Item. the shoe (or heel piece) Charles Newbold aforesaid in the construction of his improved plough, made a bar of wrought Iron to extend from the wing of the share, back to the end of the land side, and to lay flat on the under part of it; and fastened it on with a screw bolt passing up through both this bar (which is properly a shoe or heel piece) and the land side.

The Stephens of New York, in the construction of their improvements on the plough in 1820 and '21 applied a shoe (or heel piece) on the bottom of the land side of their plough, which they fastened on by extending an ear (or projection) up and on the inside of the land side, with a small screw bolt passing through both. Now it is manifest that shoes of such construction as these, will only protect the bottom of the land side, whilst the side, though quite as much exposed is not protected at all. Then to obviate this inconvenience I make a countersink (or groove) on the outside and lower edge of the land side of my plough, which forms a birth, for the shoe, and admits of thickness enough for the substance of the shoe, that may be required, without any inconvenience from its projecting out see (K.K.) Fig. 3, and 5. I make the shoe to extend round, and under the bottom of the land side, and fasten it on with a small screw bolt. By which means the shoe thus constructed protects both the side and bottom of the land side. In making my shoe if made of cast iron they may be made in metallic moulds, the chill makes the shoe harder, of course they wear better, and they may be made cheaper. But they may be made of wrought iron or steel. The improvement which I claim in this Item, is, that of constructing the shoe, so that it will protect both the side and the bottom of the land side, and my mode of making the cast iron shoe, in metallic moulds all of which I claim the use and control of.

Fifth Item. My mode of making, applying, and using the share of the plough either made of wrought or cast iron. If I apply the wrought iron share I make it partly in the usual way by welding the wing of the share on a landside see fig. 6. but I make the bar to extend back of the wing some two or three inches as at (m) and fasten it to the cast iron part of the land side with a small screw bolt at (n) Fig 5. I then fasten the wing of the share to the mouldboard, with a strong screw bolt, having the head of it made to fit a tapering hole in the mould board. and passing down through the wing of the share. at (p.) fig 6. and drawn tight with a nut, If it be a right hand plough, this should be a left hand screw. and if a left hand plough then it should be a right hand screw, The point and edge of the share may be made in the common shape but I think that those shapes represented at Fig. 3. 4, and 6. are really much more useful, whether made of wrought or cast iron. If a plough works well; the point of the share is disposed to wear off round. In this, as well as in some other things. I have attempted to copy after nature, Hence it was that I made the point of the share round at first; I also made it much broader than usual: somewhere about twice the common width, and much thinner. and am now convinced from a great deal of use that has been made of shares of this construction (whether made of wrought or cast iron) that they are much better than shares made in the common shape, because they wear more uniformly. and being so much thinner, they wear longer and work better at the same expence. But if I apply the cast iron share I then make a birth or countersink on the lower and front part of the mould board at (q.) Fig 4. and at (s.) Fig. 3. on which I fit the share somewhat in the manner in which Richard B. Chenewith of Baltimore fitted the share on his improved plough. patented in the year 1808, but with some alterations and improvements, He fastened the share on his plough with two small screw bolts; and to enable him to set the edge of the share deeper as it was worn off, he made the holes in the mould board of considerable length; and in such a form that when required, the share could be moved down, or with the point or edge forward. Thus although the point and edge of the share could be extended forward, still the desired effect was not produced, the fact is. that the point and edge will naturally wear to a bevel on the underside; and it was owing to this circumstance that the share would not penetrate the ground. and not because it wanted more length and the
extending of the point and edge of the share forward, did not alter the
position of the bevel on the under part of it. Then in order to adapt the point
and edge of the share to the principle of adjustment. that is so that it may be set
deeper and deeper as the under part of it wears off and more and more beveling.
I fasten the share on my plough with a single screw bolt (two or more may be used)
and when first put on I lay between the lower edge of the mould board and the
underside of the share a small piece or strip of some soft wood as at. (A!
Fig. 3. This piece or strip may be about one fourth of an inch thick at or near
the point of the mould board and made tapering off to an edge, at the other end;
and about half or three quarters of an inch in width. This piece or strip [illegible]
-ever, should be made of a proper thickness, so as to set the point and edge of the
share level with the [illegible] of the plough. (or the land side or shoe). This has
the effect in the use of it so, that as the substance of this piece, or strip of soft wood is
somewhat elastic. it has a tendency to diminish the sharpness of the stroke, which
otherwise would be produced if the castings were to come together, But the great
advantage of this mode of applying the cast iron share to the plough is that, it affords
[illegible] of adjusting the point and edge of the share so that when it has worn
to a bevel on the under side, the piece or strip of wood may be taken out, and a
thinner one put in, and when needed that taken out entirely. By this means the point
and edge of the share as it wears off to a bevel on the under side, and is dull, so that
it would not work longer in that position, may be let down, that is, set deeper and
deeper, as much as is necessary at each time and besides that it has the effect also, of
setting the point more and more to the land, as it is set deeper, which in fact is about
as necessary to make the plough work well; as it is to let the point and edge down
Then when worked as long as it can be in this way, the pieces or strips of wood
may be inserted between the upper edge of the share and the mould board
consequently the cast iron share thus constructed, applied and used, will wear a great
deal longer and do a great deal more work, and do it better than cast iron shares
heretofore in use, and as they were used. In making the cast iron share
I also use a different process. If I have good metal, that is, that instead
moulding the pattern of the share wholly in sand, I make one part of the mould
of metal, This I consider a very material improvement because the effect is is that the shares are sufficiently chilled to render them hard enough, the metallic
part of the mould being applied to the upper surface of the share in making it render
the upper wearing part of it clean, hard, and smooth, which lessens the friction, and
again that this mode saves nearly one half the labor, in moulding, of course the shares
are cheaper. I have also made some cast iron shares in moulds made wholly of metal
but hitherto they seem to be too much chilled, and are so brittle. Now what I claim
as my invention of improvement in this Item is my mode of making and manner
of applying and using the share of the plough, as here described, the use and control
of which I claim as aforesaid, whether made of wrought or cast iron.

Sixth Item. my mode of Stocking and manner of using the plough.

Formerly so far as I have been made acquainted, it was the object of all
the constructors of ploughs in the stocking of them, to make the beam immovably fast,
to the standard and the land side handle whatever may have been the mode of fastening
adopted, But Charles Newbold aforesaid in the stocking of his
improved plough, constructed it, so that, the fore end of the beam could be raised
or lowered, by the use of a key (or wedge) at the standard, but it could not be
moved side wise, and the hind end of the beam was made fast in a mortise
in the land sides handle, This was the first attempt that I am aware
of, of adjusting the set of the plough, by altering the stock. Though he did not
describe this circumstance in his specification, he told me himself that such was
~~was~~ the fact, But since that time, there has been various modes of raising and
lowering the beam of the plough at the standard, some by screws others by
keys or wedges &c In the stocking of my plough I begin by making the landside handle, fast
to the inside of the land side, as at (k.) Fig. 5, I then fit the beam solid on
a block of wood of about one inch in thickness, laid on the top of the standard,
as at (u.) Figs 4 and 5, then I make the hind end of it to fit fair against the inside
or outside of the handle, as at (w.) Fig. 4 and 5, I then make the beam fast on
the standard with a strong screw bolt, either passing up through the front
part of the standard and the beam as at (j) Fig 5. or by passing a screw
bolt inclined down through the beam and standard as at (j) Fig. 4. Either
of these modes will permit the beam to move on the top of the standard in the
manner of a swivel, so that I can move the fore end of it to the right or left at pleasure. the hind end of the beam I then make fast to the inside or outside of the
land side handle as at (W.) Fig 4 and 5. with a screw bolt. my object in using
this mode of applying and fastening the beam, on the standard and to the handle
is for the purpose of affording the ploughman an oppertunity of adjusting the
plough. That is if the plough is disposed to work too shallow, it may be set deeper
by merely putting a piece of leather (or wood) between the top of the standard
and the beam, or rather the block under the beam.) and if one piece is not enough
put in as many as may be required. But if the plough should work
too deep, then take some off the block and thus let it down, or raise it up until
it works (or runs) precisely right for depth, or, the fore end of the beam, may be raised
or lowered as much as may be required for any kind of work, by affixing the hind
end of it higher or lower at the handle, By the use of this mode of adjusting
the plough it may very soon be [illegible] to work after either horses, mules, or
Oxen. I then fasten the other handle to the mould board, with two small
screw bolts as at Fig. 4, and 5. the two handles I connect together with two
rounds see (W. W.) Fig. 4 and 5. Thus framed if it is desired to set the
plough more to land, then I loose the upper screw bolt; by which the handle
is fastened to the mouldboard, and drive a wedge between the handle
and the mould board, as at (Z) Fig. 5 and as required. I loose the screw
and drive the wedge, until the plough takes land enough. But if the
plough should take too much land, then I loose the lower bolt and drive a
wedge between the lower end of the handle and the mould board. Hence it is
that by this simple process, I can alter my plough, so as to work deep or shallow
take a wide or a narrow furrow with very little trouble, and to an ab
solute certainty, so that in ploughing if the team does not walk to suit
the plough I can soon set the plough to suit the team. But again if
I wish to set a two horse plough to work after three horses abreast, then I
loose the beam from the handle and put in a block of about two inches thick
as at (w. x.) Fig. 5. it may require more or less, the thickness of the block must
be adjusted by practise. But then the end of the screw bolt, which
confines the end of the beam, the block and the handle together must have a
brace, applied, which I make fast up the handle, fifteen or eighteen inches
above, By this means a plough may be changed from a two to a three, or from a three to a two horse plough at pleasure, and with any little trouble and even more than that. if required (which it sometimes is) the plough may be made, to work after the team walking on the sward or turf by the side of the open furrow, and still the plough work well, and the only alteration required will be to put in a thicker block between the handle and the end of the beam. This has been required and done in marsh land where the horse or mule: or Ox could not walk in the open furrow.

The only use of the block which I put under the beam of my plough and on the top of the standard is that it raises the beam that much higher from the ground and affords an opportunity of continuing the curve of the throat of the plough in a more complete form than it would be with out. at the same expence, and also if it be required to let the beam down, on the top of the standard the block may be dropped off, without weakening the Beam, I mostly fasten the block to the beam with nails

What I claim as my invention of improvement in this Item, is, my mode of applying the beam to the standard, and my manner raising and lowering it on the standard, and my mode of fastening the end of the beam on the side of the handle, together with that of adjusting the fore end of the beam, by turning it to the right or left, and of making the hind end of it fast to the handle higher or lower, and the application of the blocks between the beam and the standard, and the beam and the handle, all of which I consider to be valuable improvements, and therefore claim the use and controle of them as aforesaid.

Seventh Item. Of the coulter if I apply the locked coulter, I put it on a nib on the point of the share, which of course must be made of wrought iron. The only difference in my mode of applying the Locked coulter to the plough: from what has been common, is that instead of making a mortise in the beam, for the upper end of the coulter to pass through and be made fast in, I make a mortise on the land side of the beam, by putting on a block of wood with a place cut in it which forms a mortice by the side of the beam, this block I fasten on with screw bolts, and of course I can give the coulter any inclination back that may be required, and fasten it tight with wedges in the usual way. The advantages of applying and and using the locked coulter in this way is, that it sets the top of it to lean a
little over to the land, which causes it to detach the furrow slice from the sward
(or sod) more easily than it would, if it was set vertical, or inclined a little over
to the furrow; <u>and again</u>, it does not injure the beam so much as that of making
a coulter mortise through it. But having satisfied myself, by actual experiment
that it requires an increase of 33 per cent of power in the draught or more, to
urge the plough along with a <u>locked</u> <u>coulter</u> than with sward coulter, proper
-ly fitted to it, my attention was principally directed to the latter, But this I apply in a different manner from any heretofore in use.
Instead of putting the coulter through a mortise in the beam, I apply it
to the side of the beam, see (y.) Fig. <u>4 and 5.</u> My mode of fastening the coul
-ter is thus, I have holes made through the coulter shank, I then put a
strong screw bolt through the beam, and the coulter at whatever hole is
best suited to my purpose, I then apply a strong iron strap on the outside
of the coulter, having a hole in it for the screw bolt to pass through, all of
which I draw hard up with a nut, then having the lower end of this
strap, made square or round in front of the standard in the end, I bend
it back behind the coulter and round in front of the standard or throat
of the plough. Thus fitted on, if the coulter rests solid against the
side of the standard and fair against the beam, it will be very perma-
nent, and cut the sward or sod to the greatest possible advantage, and
which to operate most beneficially, the edge should not be more than about five
inches forward of the throat and from half to an inch to the land, The effect
is; that having the sward coulter thus applied the point of the share when at
work, runs from two to three and sometimes five or six inches in advance
of the edge of the coulter, by which means it has the sward or sod so much
raised, that it is very much strained, if not in the act of tearing, then the
edge of the coulter slits it open in the very easiest and neatest manner, pos
-sible. That which I claim in this <u>Item</u> as my invention of improvement ✓
is, the mode of applying the <u>coulter</u> to the side of the beam, instead of
through a mortise in it, and more especially, that of the particular man-
-ner of fastening the sward coulter to the plough, and using it so as not
to cut the sod, until the point of the share has raised it up so as to have

United States Patent

Patent No.: X2954 it on a train; all of which I claim the use and control of, whether to use, or vend, or dispose of to others to use or vend as aforesaid.

Witness:

Alex. McPatrick
J. McDonald

Sidson Davis (6816 words)

Ent.
Ch. M.

DRAFTSMAN'S DIVISION.

*All communications should be addressed to*
"The Commissioner of Patents,
Washington, D. C."

2—328 a.

*DEPARTMENT OF THE INTERIOR,*

United States Patent Office.

*Washington, D. C.,* ........................................, *189*__

*SIR:*

*The printed* ............copies............ *of Patent No.* G. Davis

.......are....... *exhausted.* May 27, 1818

*As soon as reprinted a copy will be mailed you to complete your order.*

........................................................................................................

........................................................................................................

*By direction of the Commissioner:*

*Very respectfully,*

........................................................

*Chief Clerk.*

........................................................

........................................................

........................................................

3143b6-97-5m